US012776336B2

(12) United States Patent
Naylor et al.

(10) Patent No.: US 12,776,336 B2
(45) Date of Patent: Oct. 27, 2026

(54) SYSTEM FOR PROCESSING TEXT, IMAGE AND AUDIO SIGNALS USING ARTIFICIAL INTELLIGENCE AND METHOD THEREOF

(71) Applicant: KAI Conversations Limited, Maidenhead (GB)

(72) Inventors: David Naylor, Peterborough (GB); David Williams, Maidenhead (GB); Richard Wilson, Peterborough (GB); Adam Knights, Wargrave (GB)

( * ) Notice: Subject to any disclaimer, the term of this patent is extended or adjusted under 35 U.S.C. 154(b) by 256 days.

(21) Appl. No.: 18/311,753

(22) Filed: May 3, 2023

(65) Prior Publication Data

US 2024/0371397 A1 Nov. 7, 2024

(51) Int. Cl.
*G10L 25/63* (2013.01)
*G06V 10/774* (2022.01)
(Continued)

(52) U.S. Cl.
CPC ............ *G10L 25/63* (2013.01); *G06V 10/774* (2022.01); *G06V 20/41* (2022.01); *G06V 40/171* (2022.01);
(Continued)

(58) Field of Classification Search
CPC ....... G10L 25/63; G10L 15/063; G10L 15/06; G10L 15/1822; G10L 15/18; G10L 15/30; G10L 25/57; G10L 15/26; G06V 10/774; G06V 20/41; G06V 20/49; G06V 20/40; G06V 40/171; G06V 40/18; G06V 40/176; G06V 40/174; G06V 40/16; G06N 3/02;
(Continued)

(56) References Cited

U.S. PATENT DOCUMENTS

2021/0201004 A1* 7/2021 Yadav .................... G06V 40/20
2021/0264162 A1 8/2021 Reece et al.
(Continued)

OTHER PUBLICATIONS

International Search Report and Written Opinion issued for International Patent Application PCT/IB2024/054246, on Jul. 4, 2024, 10 Pages.

*Primary Examiner* — Huyen X Vo
(74) *Attorney, Agent, or Firm* — RC Trademark Company

(57) ABSTRACT

There is disclosed a system (100, 200) for processing at least concurrent audio signals (ASs) and image signals (ISs) to generate corresponding analysis data including emotional measurements. The system (100, 200) includes a computing arrangement (102) to include at least audio processing module (APM, 104) and image processing module (IPM, 106) for processing AS and IS. Each module (104, 106) uses artificial intelligence (AI) algorithm(s). The IPM (106) is configured to process facial image information present in IS identifying key facial image points indicative of facial expression and to generate temporal facial status data (TFSD). The APM (104) is configured to process speech present in AS by parsing speech to correlate against a database (108) of words to generate text data (TD), and by processing speech to determine temporal speech frequency information (TSFI), to temporally related TSFI with TD. The computing arrangement (102) further includes an analysis module (110) using AI algorithm(s) to process TFSD, TD and TSFI using emotional models generating interpretation of ASs and ISs generating analysis data including emotional measurements.

14 Claims, 5 Drawing Sheets

(51) Int. Cl.

| | |
|---|---|
| ***G06V 20/40*** | (2022.01) |
| ***G06V 40/16*** | (2022.01) |
| ***G10L 15/06*** | (2013.01) |
| ***G10L 15/18*** | (2013.01) |
| ***G10L 15/30*** | (2013.01) |
| ***G10L 25/57*** | (2013.01) |

(52) U.S. Cl.

CPC .......... *G06V 40/176* (2022.01); *G10L 15/063* (2013.01); *G10L 15/1822* (2013.01); *G10L 15/30* (2013.01); *G10L 25/57* (2013.01)

(58) Field of Classification Search

CPC .......... G06N 20/00; A61B 5/165; A61B 5/16; G06F 40/30

See application file for complete search history.

(56) References Cited

U.S. PATENT DOCUMENTS

| | | | | |
|---|---|---|---|---|
| 2022/0319181 | A1* | 10/2022 | Kanuganti ............... | G09B 7/02 |
| 2023/0021339 | A1 | 1/2023 | Bosnak et al. | |
| 2023/0360437 | A1* | 11/2023 | Shin ..................... | H04N 21/258 |
| 2024/0087597 | A1* | 3/2024 | Byun ...................... | G10L 25/63 |

* cited by examiner

SYSTEM FOR PROCESSING TEXT, IMAGE AND AUDIO SIGNALS USING ARTIFICIAL INTELLIGENCE AND METHOD THEREOF

TECHNICAL FIELD

The present disclosure relates to systems for processing text, image and audio signals to generate corresponding processed data, wherein the processed data includes analysis data including emotional measurements. Moreover, the present disclosure relates to methods for using aforesaid systems to process text, image and audio signals to generate corresponding processed data, wherein the processed data includes analysis data including emotional measurements. Furthermore, the present disclosure relates to software products executable on computing hardware to implement the aforesaid systems, wherein the software products, when executed on computing hardware, use algorithms for implementing the aforesaid methods.

BACKGROUND

In today's world, communication has become an essential part of our daily lives. Typically, when working from home, connecting with friends and family, or conducting business across the world, we rely on remote conversations to stay connected. In particular, these remote conversations hold valuable insights such as language, tone, and non-verbal cues used during the conversations.

The analysis of recorded speech is known. A conventional known approach is to use a parser to process an audio speech signal to generate corresponding text. In a process of converting the audio speech signal to the corresponding text, certain information present in the audio speech signal is filtered out and is not represented in the corresponding text; for example, information indicative of voice pitch, voice rate-of-word speed, and other intonation and nuances are not conveyed via the parser into the corresponding text. The corresponding text may then be analysed using an AI engine, for example, based on deep neural networks, Hidden Markov Models (HMM) and similar, to extract its substantive meaning. Moreover, the analysis of images from such communications is known, for example for performing face recognition. However, a portion of a given face is altered when making facial expressions. Such alterations are known to be susceptible to being detected using face recognition. However, it will be appreciated that video conferencing tools are becoming used more frequently, particularly after the COVID outbreak that has forced people to work at home and communicate with other people via video calls. Such video calls enable such people not only to hear other people, but also to see other people via video.

However, a given observer analysing conversations manually results in low sample sizes and is subject to the skill and interpretation of the given observer, wherein the given observer may miss key aspects of conversations and may also be biased due to the given observer applying a subjective interpretation of a particular given expression arising in the conversations. Suitably, emotional intelligence is a key component when communicating effectively and achieving positive outcomes from human interactions. Understanding the flow of emotions from mutually-interacting participants over time unlocks an understanding of what is causing positive and negative connection points. Displaying this flow of emotions makes participants more aware of the positive and negative behaviours and patterns that cause these. However, traditional methods of conversational analysis involve a given person observing a conversation and coming to their own opinions and conclusions. This is not only labour-intensive, expensive and time-consuming, but also quite often subjective and inconsistent.

Conventional known AI-based conversational intelligence solutions suffer two key limitations:

(i) they can flag general issues (namely, sentiment) and can search for occurrence of given words or phrases (for example, words of sadness); and (ii) they are unable to analyse conversations with enough depth or specificity to be truly actionable for a given individual (namely, are not able to perform accurate emotional measurements).

Moreover, conventionally, the insights are generic and not accurate, specific, or actionable. None of such known solutions combine emotional text analysis with facial emotion analysis, which is capable of providing feedback on a manner in which an impact an assessed individual may have on another individual. Furthermore, none of the known solutions provide deeper conversational analysis that measures how emotions develop as a function of elapsed time and one or more positive outcomes which are achieved based on interaction patterns between such individuals.

Therefore, in light of the foregoing discussion, there exists a need to overcome the aforementioned drawbacks associated with analysing oral and visual interaction arising between a plurality of individuals who are configured to mutually interact.

SUMMARY

The present disclosure provides a system for processing at least concurrent audio and image signals to generate corresponding analysis data including emotional measurements; moreover, the present disclosure provides a method of (namely, method for) using the aforesaid system to process at least audio and image signals to generate corresponding analysis data including emotional measurements. The present disclosure provides a solution to the existing problems of how to provide an efficient system for processing at least concurrent audio and image signals and method using the aforesaid system. An objective of the present disclosure is to provide a solution that overcomes at least partially aforementioned problems encountered in the prior art and provides an improved system for processing at least concurrent audio and image signals. Moreover, an objective of the present disclosure is to provide an improved method for using the aforesaid system to process at least audio and image signals to generate corresponding analysis data including emotional measurements.

One or more objectives of the present disclosure are achieved by the solutions provided in the enclosed independent claims. Advantageous implementations of the present disclosure are further defined in the dependent claims.

In a first aspect, the present disclosure provides a system for processing at least concurrent audio and image signals to generate corresponding analysis data including emotional measurements, wherein the system includes a computing arrangement that is configured to include at least an audio processing module for processing the audio signal and an image processing module for processing the image signals, wherein each module is configured to use one or more artificial intelligence algorithms for processing its respective signal, wherein the image processing module is configured to process facial image information present in the image signal to identify a plurality of key facial image points indicative of facial expression and to generate temporal facial status data, wherein the audio processing module is configured to process speech present in the audio signal by parsing the speech to correlate against a database of words to generate corresponding text data, and by processing the speech to determine temporal speech frequency information indicative of at least one of emphasis, hesitation, speech word rate, and to temporally relate the temporal speech frequency information with the text data, and wherein the computing arrangement further includes an analysis module using one or more artificial intelligence algorithms that is configured to process the temporal facial status data, the text data and the temporal speech frequency information using emotional models to generate an interpretation of the audio and image signals to generate the analysis data including the emotional measurements.

The system uses the computing arrangement to process at least concurrent audio and image signals to generate corresponding analysis data including emotional measurements. The system enables revealing hidden human insight arising during a given conversation by analysing the audio signals and the image signals. Moreover, the depth and accuracy of the analysis, combined with the conversational models, enables more specific insights to be derived. Furthermore, the system provides a plurality of participants participating in a given conversation with pertinent analysis, by cutting through noise that is included in the concurrent audio and image signals. Moreover, the system may be configured to provide real-time analysis, so that participants engaged in conversations with other participants may be guided to adjust their conversational actions in real-time, enabling real-time guidance of the participants, for example to achieve a better negotiating position in a discussion.

In an implementation form, the image processing module is configured to process the image signals including video data that is captured concurrently with the audio signal.

In such an implementation, the system is designed to handle the image signal, particularly video data, that is acquired simultaneously with the audio signal. Notably, various image processing operations may be performed on the video data of a given individual to extract first emotional information therefore, and various processing operations may be performed on concurrent audio data of the given individual to extract second emotional information therefrom; synchronizing both corresponding audio and video signals and their associated first emotional information and second emotional information enables a more accurate and effective analysis to be achieved; for example, the audio signal may include sad emotional information, whereas the visual signal may include happy emotional information, wherein analysis of such a discrepancy between the first and second emotional information may be used to determine a measure of emotional sincerity of the given individual.

In a further optional implementation, the system is configured to process a text signal in addition to the at least audio and image signals, wherein information present included in the text signal is used in conjunction with the information included in the audio and image signals to generate the corresponding analysis data including the emotional measurements.

The system is configured to process the text signal along with audio and image signals, and integrates information to generate analysis data that includes emotional measurements. This allows comprehensive and nuanced analysis of the information of the communication being analysed; for example, during a video call in which audio and image signals are communicated, it is quite common that documents to be discussed are circulated between participants before holding a videocall, wherein the documents are usefully analysed a priori, before holding the video call.

In a further implementation form, the one or more artificial intelligence algorithms include at least one of: neural networks, deep neural networks, Boltzmann machines, Hidden Markov Models, for processing at least the audio and image signals.

In such an optional implementation, the one or more artificial intelligence algorithms are capable of processing vast amounts of data and extracting meaningful information from audio and image signals, which may be used for various applications such as emotion recognition, speech analysis, facial expression analysis, and more. Additionally, these algorithms may adapt and improve their performance over time through training with additional data, making them highly flexible and capable of handling different types of audio and image signals. The technical effect of using these algorithms is the enhanced accuracy and efficiency in processing audio and image signals, leading to improved performance and reliability of the system in generating emotional measurements and analysis data from the input signals.

In a further implementation form, the analysis module is configured to use at least the emotional measurements to determine decision points occurring in a video discussion giving rise to the audio and image signals.

In such an implementation, the analysis module uses emotional measurements derived from the audio and image signals to identify decision points occurring in the video discussion. Beneficially, the decision points enable, namely temporally abrupt changes in emotional measurements, the system to gain insights into important moments during the discussion that may impact the outcome or direction of the conversation.

In a further optional implementation form, the analysis module is configured to use at least the emotional measurements to determine decision points occurring in a video discussion giving rise to the audio and image signals, wherein the decision points are determined by the analysis module from at least one of: temporally abrupt changes in the emotional measurements, temporally abrupt changes in speech content of the audio signal.

The analysis module is configured to use emotional measurements and to detect abrupt changes in the emotional measurements or speech content of the audio signal to identify decision points occurring in the video discussion. Such an analysis enables the analysis module to gain insights into important moments during the video discussion that may impact an outcome or direction of the conversation.

In a second aspect, the present disclosure provides a method for (namely, method of) training the system of the first aspect, wherein the method includes:

(i) assembling a first corpus of training material relating training values of emotional measurements to samples of audio signals including speech information;

(ii) assembling a second corpus of training material relating training values of emotional measurements of samples of image signals including facial expression information; and (iii) applying the first and second corpus of training material to the one or more artificial intelligence algorithms to configure their analysis characteristics for processing at least the audio and video signals.

In such an implementation, the performance and accuracy of the one or more algorithms in processing the audio and video signals and generating emotional measurements based on the specific characteristics and features of the input signals is improved, for example optimized, as learned from the training materials.

In third aspect, the present disclosure provides a method for (namely, method of) using the system of the first aspect to process a least audio and image signals to corresponding analysis data to generate corresponding analysis data including emotional measurements, wherein the system includes a computing arrangement that is configured to include at least an audio processing module for processing the audio signal and an image processing module for processing the image signals, wherein each module is configured to use one or more artificial intelligence algorithms for processing its respective signal, wherein the method includes:

using the image processing module to process facial image information present in the image signal to identify a plurality of key facial image points indicative of facial expression and to generate temporal facial status data, using the audio processing module to process speech present in the audio signal by parsing the speech to correlate against a database of words to generate corresponding text data, and by processing the speech to determine temporal speech frequency information indicative of at least one of emphasis, hesitation, speech word rate, and to temporally relate the temporal speech frequency information with the text data, and using an analysis module of the computing arrangement, wherein the analysis module includes one or more artificial intelligence algorithms that are configured to process the temporal facial status data, the text data and the temporal speech frequency information using emotional models to generate an interpretation of the audio and image signals, to generate the analysis data including the emotional measurements.

The method achieves all the advantages and technical effects of the system of the present disclosure.

In a fourth aspect, the present disclosure provides a software product that is executable on computing hardware to implement the methods of the second aspect and third aspect.

It is to be appreciated that all the aforementioned implementation forms can be combined. It will be appreciated that all devices, elements, circuitry, units and means described in the present application may be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity that performs that specific step or functionality, it will be clear for a skilled person that these methods and functionalities may be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they may be implemented. Although some modes of carrying out the present disclosure have been disclosed, those skilled in the art would recognize that other embodiments for carrying out or practising the present disclosure are also possible.

Figure 1A:
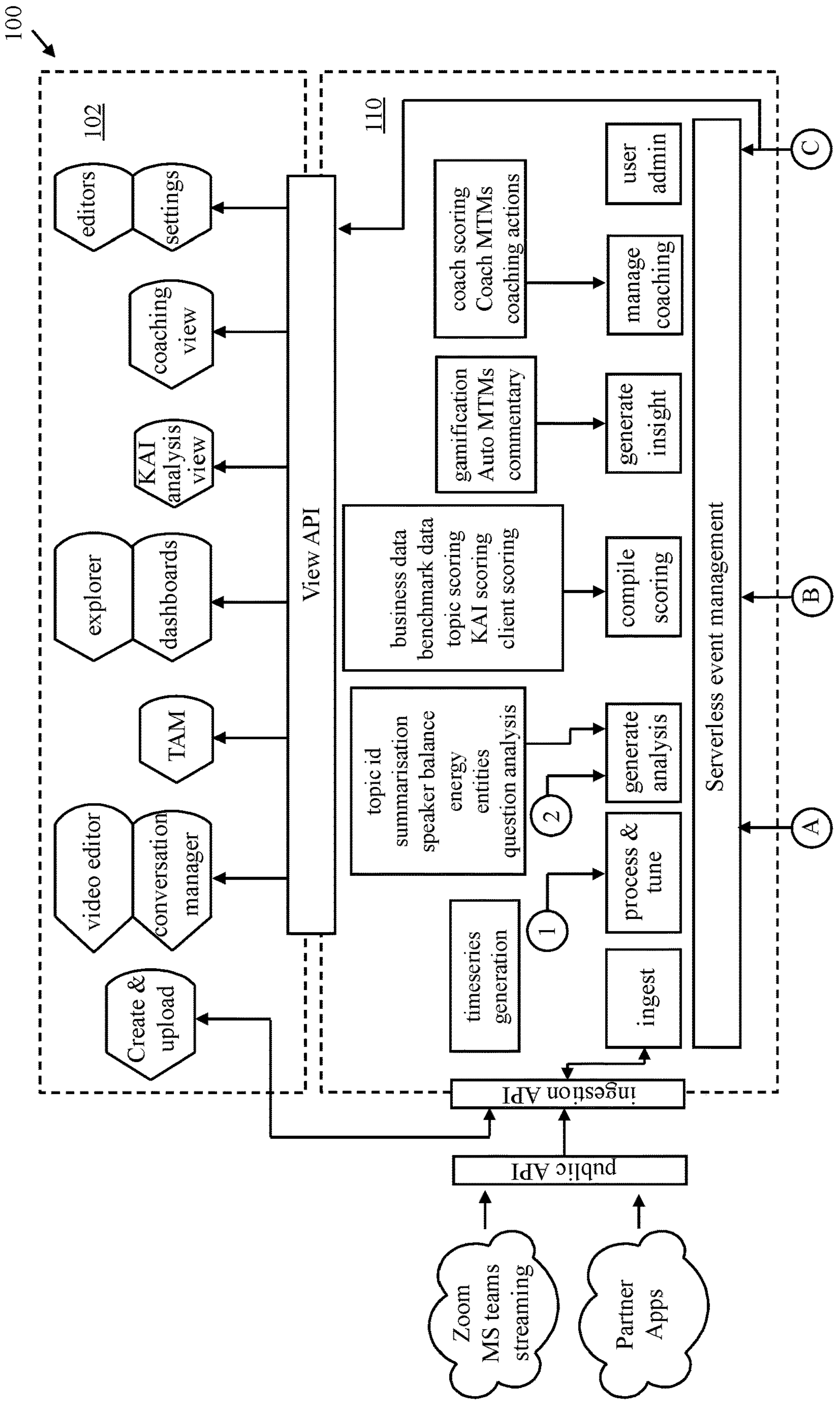
FIGS. 1A and 1B, and FIG. 2 are schematic diagrams of a system for processing text, image and audio signals (for example, at least image and audio signals) for generating corresponding analysis information including emotional measurements, in accordance with an embodiment of the present disclosure.
Figure 1B:
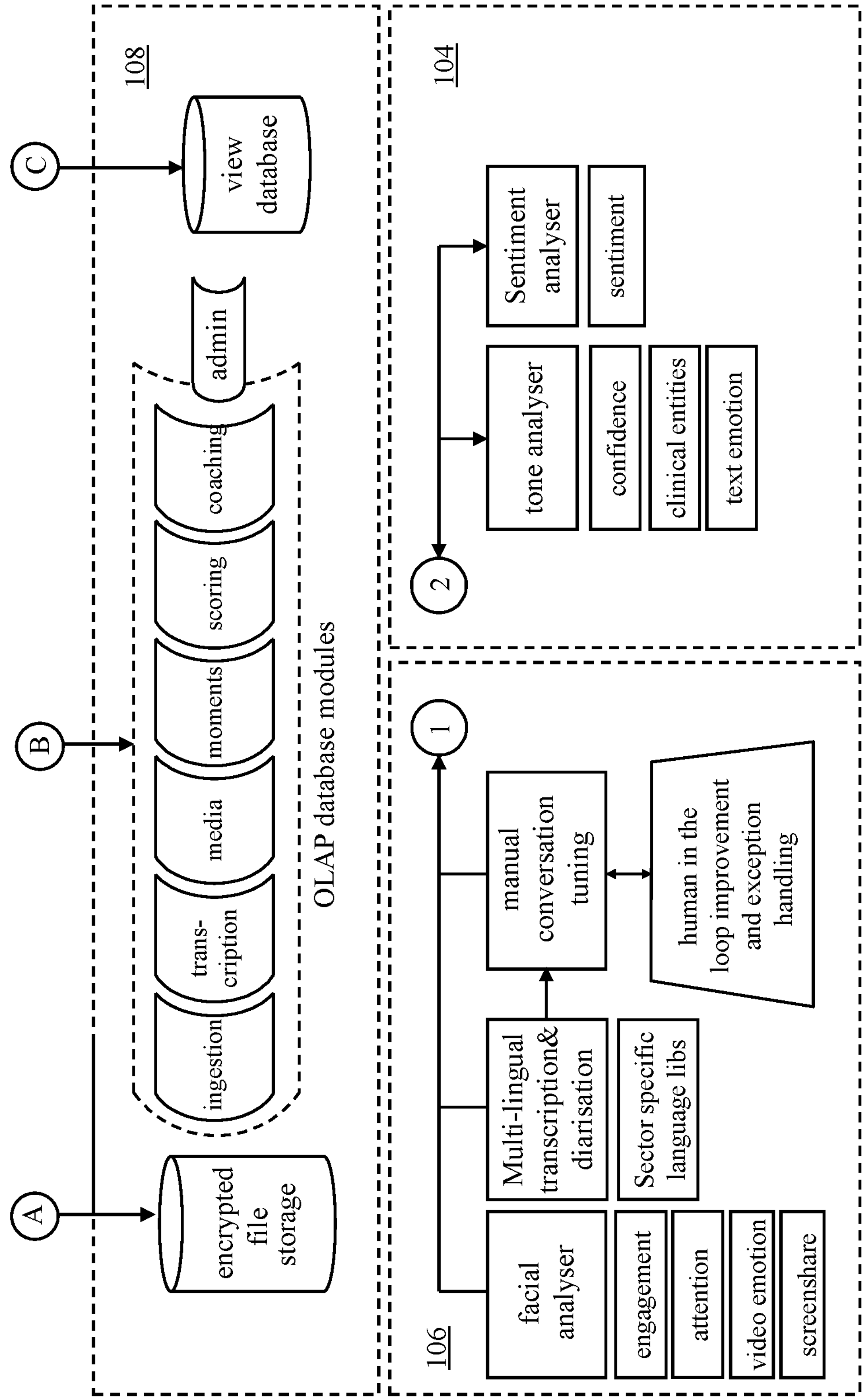
Figure 2:
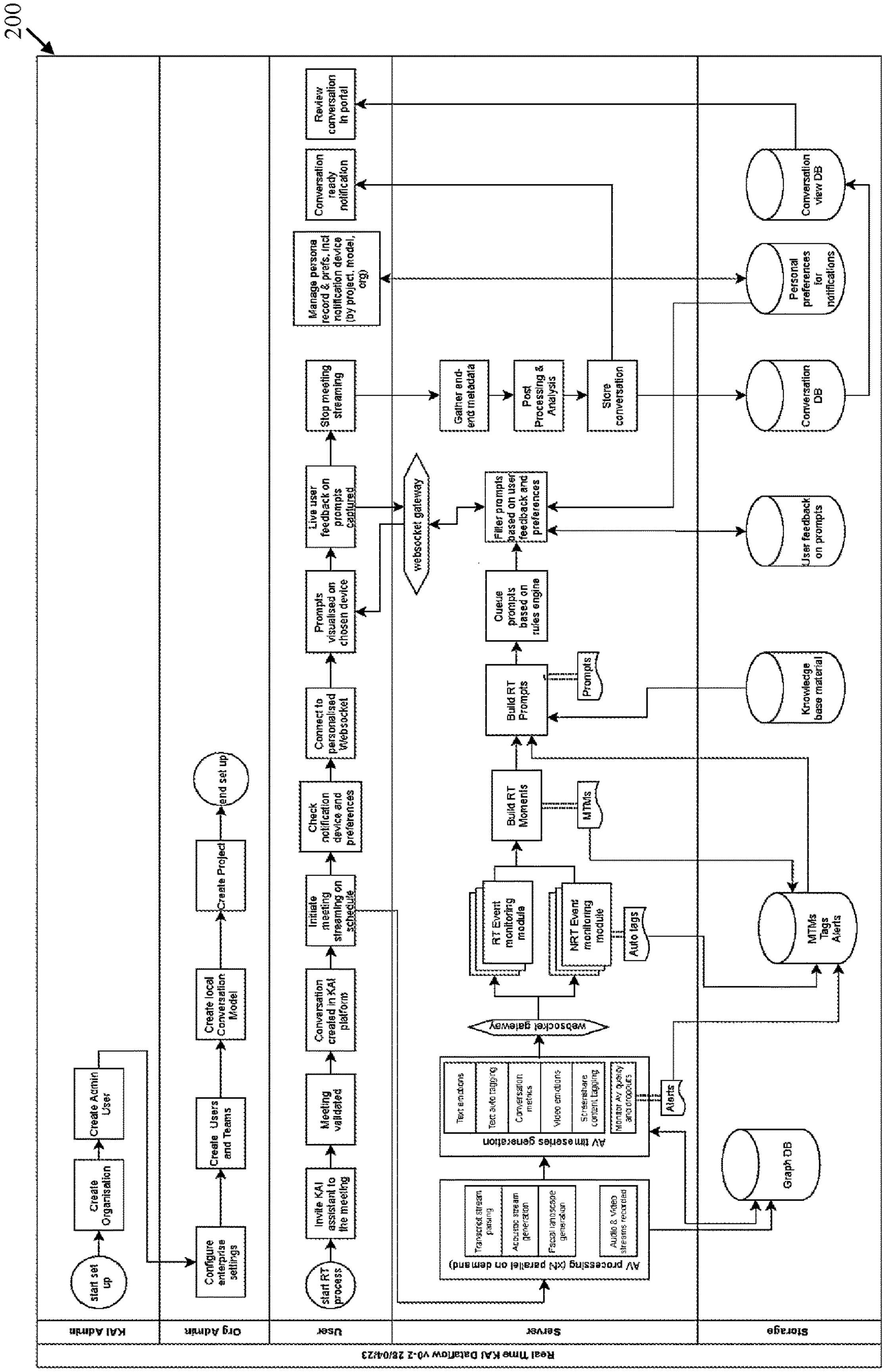

FIGS. 1A and 1B, and FIG. 2 are a schematic diagram of a system 100 for processing at least audio and image signals to generate corresponding analysis data including emotional measurements, in accordance with an embodiment of the present disclosure. With reference to FIGS. 1A and 1B, there is shown a system 100 that includes a computing arrangement 102, an audio processing module 104, an image processing module 106, a database 108 and an analysis module 110.

The system 100 includes the computing arrangement 102, which corresponds to a way in which computing resources are organized and managed to perform specific tasks efficiently. Optionally, the computing resources may include hardware, software, and network resources that function together to process and analyse audio and image signals of participants to generate corresponding analysis data. Moreover, the participants may be a person (i.e., a human being) or a virtual program (such as, an autonomous program or a bot) that is associated with or operates a user device. The user device may be an electronic device associated with (or used by) the participants, that is capable of enabling the participant to perform conversation. Furthermore, the user device is intended to be broadly interpreted to include any electronic device that may be used for voice and video communication over a wired or wireless communication network. Examples of the user device include, but are not limited to, cellular phones, personal digital assistants (PDAs), handheld devices, wireless modems, laptop computers, personal computers, and the like.

It will be appreciated that the computing arrangement 102 comprises three layers. The layers are an application layer, a middleware layer, and a hardware layer. Typically, the application layer includes software that is configured for word processing or email applications. The middleware layer provides a bridge between the hardware and application layers, wherein the bridge is configured to manage communication between different software and enabling different software to work together. The hardware layer includes components such as servers, storage devices, and network infrastructure, that are utilised to run the software and process data.

Suitably, for audio signals, the computing arrangement 102 includes software for speech recognition, audio noise reduction, and audio enhancement, and hardware such as microphones or sound cards. The middleware layer may include a speech-to-text recognition that converts the audio signal into transcribed text, or a natural language processing algorithm that extracts meaning from the transcribed text. Optionally, the hardware layer may include servers or clusters of servers that may process large amounts of audio data in real-time. The servers or clusters or servers may be configured as array processors for performing massively-parallel computations.

Similarly, for the image signals, the computing arrangement 102 includes software for performing image recognition, image enhancement, and computer vision, and hardware such as cameras or graphics processing units (GPUs). The middleware layer may include algorithms for performing object detection, facial recognition, or optical character recognition (OCR), which may identify and analyse features within images. Optionally, the hardware layer may also include servers or clusters of servers that may process large amounts of image data in real-time. The servers or clusters or servers may be configured as array processors for performing massively-parallel computations.

The system 100 includes the audio processing module 104. The "audio processing module" refers to a software or hardware component that is used to manipulate audio signals. The audio processing module 104 is used for audio editing, speech recognition, noise reduction, and audio enhancement. Optionally, the audio processing module 104 comprises a filter module. The filter module is used to remove unwanted noise or interference from audio signals, such as hum or hiss. Examples of the filter module include one or more high-pass filters, low-pass filters and notch filters. Optionally, the filters may be adaptive to accommodate temporally changing spectral characteristics of the audio signals, for example to cope with voice fatigue occurring during a videocall.

In an embodiment, the audio processing module 104 further comprises a tone analyser. The tone analyser operates by analysing the tone of the audio signal, such as during the use of certain words or phrases, and sentence structure. It will be appreciated that the machine learning algorithms are further used to determine the overall tone of the text, such as whether it is positive, negative, or neutral, and identify specific emotions or sentiments that are present thereof. In another embodiment, the audio processing module 104 further comprises a sentiment analyser. The sentiment analyser works by analysing the sentiments of the audio signal. Overall, the audio processing module 104 helps in manipulating and enhancing audio signals to achieve the desired sound and level of clarity.

The system 100 includes the image processing module 106. The "image processing module" refers to a module that is used to capture images of the participants. Optionally, the image processing module 106 may capture a video of the participants. Moreover, the image processing module 106 may capture the frames of each of the videos captured by the imaging device. Optionally, the imaging device may be a camera of the device implemented for the conversation. For example, during a video conferencing of two participants using the laptop, the audio signal is recorded using the microphone and the image signal is captured using the camera of the laptop. Notably, the image processing module 106 is designed to handle the video signal, which comprises a sequence of images played back at a certain frame rate to create a moving picture. The video signal may include visual content such as scenes, objects, or events that are captured by a camera or other imaging device. As shown, the system ingests both audio and video signals simultaneously associated with participants.

In an embodiment, the image processing module 106 is configured to process the image signals including video data that is captured concurrently with the audio signal. Notably, the image processing module 106 is designed to process the image signal captured using image processing module 106 and the audio signal recorded using the audio processing module 104 simultaneously. The term "captured concurrently" refers to the image signal and audio signal being recorded or acquired at the same time, typically from the same device. Such a concurrent capture refers to situations where audio and video are recorded simultaneously in applications such as video recording, live streaming, or video conferencing.

The concurrent processing of audio and image signals allows for synchronized analysis and manipulation of both modalities, which can enable accurate processing results. For example, in video conferencing, the image processing module 106 could analyse the image signal to detect facial expressions, gestures, or other visual cues, while simultaneously processing the audio signal to detect speech or other audio features. This synchronized processing can enhance the overall quality and effectiveness of the system 100 in capturing and analysing both audio and image information.

The system 100 includes the database 108. The database 108 refers to a storage medium that comprises the words. In an embodiment, the database 108 comprises a dictionary comprising a plurality of words. The audio processing module 104 may be configured to process speech present in the audio signal by parsing the speech to correlate against the words stored in the database 108 to generate corresponding text data, and by processing the speech to determine temporal speech frequency information indicative of at least one of emphasis, hesitation, speech word rate, and to temporally relate the temporal speech frequency information with the text data. Optionally, the database 108 may include, but is not limited to, internal storage, external storage, a universal serial bus (USB), a Hard Disk Drive (HDD), a Flash memory, a Secure Digital (SD) card, a Solid-State Drive (SSD), a computer-readable storage medium or any suitable combination of the foregoing.

The "temporal speech frequency information" refers to the changes or variations in the frequency of speech over time. Suitably, the temporal speech frequency information involves the analysis and characterization of the frequency components of speech that evolve or vary over different time intervals. The speech is composed of various frequency components that correspond to the different speech sounds or phonemes. These frequency components can change rapidly over time as speech sounds are produced and transition from one to another. Temporal speech frequency information captures the dynamic nature of speech and provides insights into the time-varying spectral characteristics of speech. The temporal speech frequency information can provide important insights of the audio signal, such as prosody, intonation, and speech rate. For example, temporal speech frequency information can reveal the pitch or frequency variations in the audio signal that convey information about the participants emotions, emphasis, or linguistic meaning.

The system 100 includes the analysis module 110. The "analysis module" 110 refers to a module that utilizes artificial intelligence algorithms to analyse and interpret audio and image signals. Specifically, the analysis module 110 is configured to analyse the temporal facial status data, text data, and temporal speech frequency information, using emotional models. The analysis module 110 is configured to generate the analysis data that includes emotional measurements.

Suitably, the "temporal facial status data" refers to information about the facial expressions, movements, or other changes in the face captured over time. Optionally, the analysis module 110 may use computer vision techniques to track and analyse facial features and movements, which may provide insights into the emotional state of the participants being analysed. For example, the analysis module 110 may detect smiles, frowns, raised eyebrows, or other facial expressions of the participants that are indicative of different emotions. Similarly, the text data comprises the transcriptions of spoken words, captions, or other text data. Optionally, the analysis module 110 may use natural language processing techniques to analyse the text data. Moreover, the temporal speech frequency information as discussed above is also utilised to generate the analysis data including the emotional measurements. The term "emotional measurements" refer to the quantitative or qualitative measurements or indicators of emotions that are extracted or derived from the analysis of the audio and image signals.

It will be appreciated that the analysis module 110 is configured:

(i) to analyse the audio and image signals of the participants during the video conferencing; and (ii) to track the temporal facial status data, text data, and temporal speech frequency information.

By tracking the participants' audio and image signals on the user device, such racking helps to monitor and analyse the interaction between the at least two participants during the video conferencing. The tracking helps in identifying patterns and trends during the conversation of the each of the two participants, and helps in determining any potential issues or misunderstandings that may arise during the conversation. In particular, the analysis primarily focuses on the performance of each participant.

Moreover, by tracking participants' on the user device, the analysis module 110 functions to monitor and analyse the interaction between the participants for identifying patterns and trends when screensharing by the participant during the video conferencing. For example, the analysis module 110 is configured to analyse a given customer (first participant) and a given advisor (second participant) during the meeting. The screensharing refers to the process of sharing the contents of one participant's screen with others during the meeting (such as video conferencing), typically for the purpose of presenting information. When screensharing during the video conferencing, it becomes possible to analyse the valuable insights from the participants' audio and image signals during conversation such as satisfaction, interaction time, and overall engagement levels. For example, if a customer spends a significant amount of time engaged with a screenshared presentation, it may indicate that the customer is particularly interested in the content being shared.

In an embodiment, the system 100 is configured to process a text signal in addition to the at least audio and image signals, wherein information present included in the text signal is used in conjunction with the information included in the audio and image signals to generate the corresponding analysis data including the emotional measurements. In this regard, the "text signal" refers to any written or textual information that is part of the communication or data being processed by the system 100. The text signal may include transcripts of speech, text-based chat messages, captions, or any other form of textual data associated with the audio and image signals being analysed.

The system 100 is configured to process the text signal in addition to the audio and image signals for generating the analysis data. The information present in the text signal is used in conjunction with the information included in the audio and image signals to generate the analysis data, which includes emotional measurements. The system 100 combines data from different sources to obtain an accurate and comprehensive analysis of emotions. Beneficially, by integrating the information from the text, audio, and image signals, the system 100 is able to generate analysis data that includes emotional measurements, providing a more holistic and in-depth understanding of the emotional aspects of communication.

In an embodiment, the one or more artificial intelligence algorithms include at least one of: neural networks, deep neural networks, Boltzmann machines, Hidden Markov Models, for processing at least the audio and image signals. In this regard, the analysis module 110 utilizes one or more artificial intelligence algorithms to process the temporal facial status data, the text data and the temporal speech frequency information. Optionally, the one or more artificial intelligence algorithms include at least one of: neural networks, deep neural networks, Boltzmann machines, Hidden Markov Models that are trained or designed to generate the interpretation of the audio and image signals. More optionally, the analysis module 110 may be pre-trained or customized to specific emotional contexts, such as happiness, sadness, anger, or surprise and may use pattern recognition, statistical analysis, or other techniques to identify emotional cues from the temporal facial status data, text data, and temporal speech frequency information. Based on the output generated from the analysis module 110 is analysis may represent the emotional state or intensity of the participants in the audio and image signals, and can be used for various applications such as emotion recognition, affective computing, virtual reality, or human-computer interaction.

In an embodiment, the analysis module 110 is configured to use at least the emotional measurements to determine decision points occurring in a video discussion giving rise to the audio and image signals. In this regard, the analysis module 110 utilizes at least emotional measurements (such as emotional state, intensity, or expression) of the participants to identify decision points that occur during the video discussion. The term "decision points" refer to specific moments or events that occur during the video discussion where important decisions are made or critical actions are taken. Typically, the decision points may include moments where participants express strong emotions, provide critical information, make key statements, or engage in significant interactions that may impact the overall outcome or direction of the conversations. For example, if the emotional measurement indicates a high level of excitement, frustration, or disagreement among the participants, it may signal a decision point where emotions are running high and critical decisions are being made. Optionally, by identifying decision points in the video discussion, the analysis module 110 provides insights or cues in the discussion that may require attention.

In an embodiment, the analysis module 110 is configured to use at least the emotional measurements to determine decision points occurring in a video discussion giving rise to the audio and image signals, wherein the decision points are determined by the analysis module 110 from at least one of: temporally abrupt changes in the emotional measurements, temporally abrupt changes in speech content of the audio signal. In this regard, the analysis module 110 utilizes emotional measurements to identify decision points that occur during the video discussion. Typically, the decision points are determined based on abrupt changes in the emotional measurements or speech content of the audio signal. The analysis module 110 utilizes the at least emotional measurement to identify decision points by examining for temporally abrupt changes in the emotional measurements. This may involve detecting sudden and significant shifts or fluctuations in the emotional state, intensity, or expression of the participants during the video conferencing. For example, if there is a sudden increase in the emotional measurements indicating a shift from a calm to an excited state, it may signal a decision point where emotions are heightened and important discussions or actions are taking place.

With reference to FIG. 2, there is shown a system 200 for processing text, image and audio signals (for example, image and audio signals) for generating corresponding analysis information including emotional measurements at real-time. As shown in system 200, the flow of data in real time. The layout of the application includes multiple icons and visual elements that represent different analysis components of the conversation analysis system. These icons are strategically placed within the GUI and are visually linked to corresponding parts of the conversation transcript. The meeting for the participants is initiated and the participants are invited within the meeting. Suitably, the representations of the conversation, along with video and audio signal. The transcript is color-coded to highlight different conversation stages, which are automatically identified by the system using one or more AI algorithms based on sentence topics. The conversation stages are represented by different labels, for example, "Introduction," "Information Gathering," "Resolution," and the like. and are visually linked to the corresponding parts of the transcript. The one or more AI algorithms are configured to detect the sentiment analysis, language analysis (such as tone, confidence, and delivery), engagement analysis, and outcome analysis of the participants. The scoring and analysis components provide insights into how the conversation was conducted, how it was received, and the outcomes achieved.

As shown, the system 200 ingests the audio and video signals of the participants. The audio and video signals provide the system 200 with information, including vocal tone, facial expressions, and body language, which may be analysed in combination to gain a deeper understanding of the conversation.

The audio and video signals of the participants are provided for the time series generation. Time series generation refers to the process of generating a sequence of data points that are ordered in time. The system utilises one or more AI algorithms, such as acoustic, word, and visual analysis, and integrates them to work together seamlessly. For example, the system uses the audio processing module 104 to capture tone, pitch, and volume of participants' voices, while word analysis allows for real-time transcription and analysis of spoken words, and image processing module 106 captures facial expressions and body language. These combined components enable a holistic and multi-dimensional analysis of conversations, providing more accurate insights and uncovering hidden nuances that may not be apparent through individual analysis. In this regard, the application monitors the quality of the audio and video signals as well as screen sharing content. Moreover, the data is provided to the server for monitoring in real-time or near real-time.

The system 200 further enables the creation of specific conversation models, where information and a structured subset of interaction states are identified from the conversation. This pre-configuration of conversation models allows for targeted analysis based on predefined parameters and objectives, leading to more actionable insights. For example, the system may be programmed to identify specific keywords or phrases, emotional cues, or conversational patterns, and use them to generate real-time responses that align with the conversation model. The system 200, utilizes the real time or near real-time data to build real-time moments and real-time prompts. The real-time moments refer to instances where the participants are engaging with the same piece of content at the same time. These moments can create a surge of activity on the platform, and users may be more likely to engage with the content. The real-time prompts, on the other hand, are features that encourage participants to engage with content in real-time.

The real-time responses generated by the system are displayed to participants, suggesting actions they may choose to take to improve the outcome of the conversation. These actionable suggestions may range from subtle prompts to adjust tone or pacing, to more explicit recommendations on how to address certain issues or achieve desired outcomes. The real-time prompts empower participants to actively engage in the conversation and make informed decisions, leading to more effective communication and positive conversation outcomes. The system 200 comprises a knowledge base material database, the knowledge base material database is a repository of information and data that can be used to support decision-making, problem-solving, learning, and provide content to the participants. The Knowledge base material database is coupled with the real-time prompts. The Knowledge base material database includes text documents, images, videos, and the like. The knowledge base materials database is structured and organized in a way that is easy to navigate and search and be up-to-date, accurate, and relevant to the needs of the participants.

The system also enables incorporation of a human labelling and feedback loop. This loop allows for continuous improvement of the conversation model through machine learning. Human evaluators may provide feedback on the accuracy of the system's responses and identify areas for improvement. This feedback is then used to train the one or more AI algorithms, refining the system 200 performance over time and making the system 200 accurate and effective in generating real-time responses. Moreover, the system 200 comprises filter prompts to filter the available content based on the participants feedback and preferences.

The system 200 provides Moments-that-Matter (MTM) critical points in the conversation when specific actions or interventions may have a significant impact on the outcome. The system 200 uses algorithms and data analysis techniques to automatically identify these critical points, allowing for timely and targeted actions to be taken with repeatability and scalability. Additionally, the system 200 enables the analysis of conversations of a certain type with a consistent data structure, facilitating collective analysis to identify the most effective interaction patterns that may deliver the best conversation outcomes. This analysis of conversations allows for data-driven insights and evidence-based decision-making to improve conversation outcomes.

Moreover, the emotion analysis is utilised in the system 200 for implementing the conversation analysis process. By capturing and analysing participants' emotions, the system 200 enables them to be more aware of their own emotions and the impact they may have on others. Such a manner of operation fosters the development of emotional intelligence, helping participants to become more skilled in managing their emotions, and facilitating more empathetic and effective communication in conversations. Suitably, after receiving the feedback the meeting is stopped. The system 200 also enables post-process analysis of conversations in a consistent and structured manner. Such post-processing allows participants to review their individual performance and identify areas for improvement. The system 200 may provide detailed insights on conversational patterns, emotional cues, and overall conversation effectiveness. Moreover, such post-processing analysis empowers participants with self-awareness and helps them make conscious adjustments to their communication style for better emotionally-influenced outcomes in future conversations. Furthermore, the conversation data is also stored in the conversation database and the application is configured to display the stored conversation in the conversation view database tab.

Figure 3:
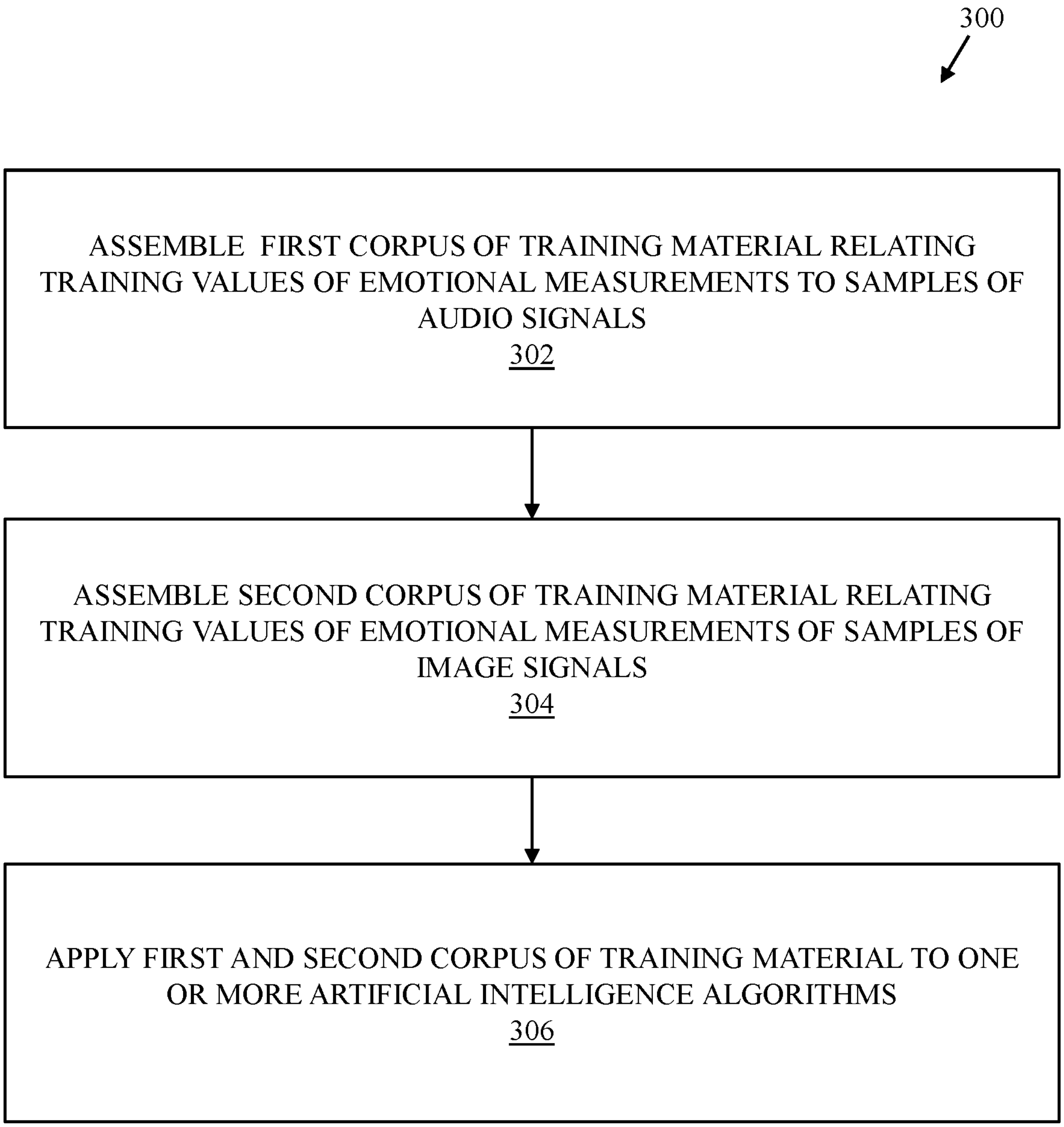
FIG. 3 is an illustration of a flowchart of a method, wherein the flowchart includes steps for training the system of FIGS. 1 and 2, in accordance with an embodiment of the present disclosure.

FIG. 3 is a flowchart of steps of a method 300 for training the system 200. The method includes steps 302 to 306. At the step 302, the method 300 includes assembling a first corpus of training material relating training values of emotional measurements to samples of audio signals including speech information. In this regard, the "first corpus of training material" refers to a collection of data that serves as the input for training values of emotional measurements. The first corpus of training material typically comprises a set of examples or samples of audio signals, which may include speech data, along with corresponding values of emotional measurements. The emotional measurements may be at least one of quantitative indicators of emotions, qualitative indicators of emotions, such as emotional labels (e.g., happy, sad, angry), emotional intensity scores, and the like. The "training values of emotional measurements" refers to the known emotional measurements associated with the samples of audio signals in the training material. These training values are used as the reference between the audio signals and the corresponding emotional measurements.

The samples of audio signals including speech information refer to the specific examples or instances of audio signals that are part of the training material and contain speech data. The samples are optionally recordings of the participants speech or other forms of audio signals that include speech information, such as transcriptions, spoken dialogues, or other speech-related data. The process of "assembling" the first corpus of training material involves collecting, curating, and preparing the samples of audio signals along with their associated emotional measurements to create a comprehensive dataset that may be used for training the system 200. The assembling may involve collecting audio data from various sources, annotating or labelling the emotional measurements, and organizing the data in a suitable format for training the model. When the first corpus of training material is assembled, it serves as a relationship between the audio signals and the emotional measurements based on the provided training values. In an embodiment, the trained model may then be used to analyse new or unseen audio signals in real-time, automatically estimating or predicting the emotional content of the speech data.

At the step 304, the method 300 includes assembling a second corpus of training material relating training values of emotional measurements of samples of image signals including facial expression information. The second corpus of training material relating training values is the process of gathering and compiling a collection of training data that associates emotional measurements with samples of image signals, specifically the second corpus of training material containing information related to facial expressions. The training material is used in the context of training artificial intelligence algorithms or models for analysing and interpreting facial expression information in image signals to generate emotional measurements. The second corpus of training material serves as a dataset that provides examples of image signals with known emotional measurements, allowing the algorithms or models to learn and generalize from this data to accurately interpret facial expression information and generate emotional measurements for the image signals.

At the step 304, the method 300 includes applying the first and second corpus of training material to the one or more artificial intelligence algorithms to configure their analysis characteristics for processing at least the audio and video signals. The first corpus of training material contains training values of emotional measurements associated with samples of audio signals, while the second corpus of training material contains training values of emotional measurements associated with samples of image signals. By applying the first and second corpus of training material to the one or more artificial intelligence algorithms, the algorithms are configured or adjusted to adapt their analysis characteristics for processing the audio and video signals.

The training of the one or more artificial intelligence algorithms enables patterns to be recognized, learning to be derived from relationships, and inferences made based on the emotional measurements in the training data, in order to accurately interpret the audio and image signals and generate corresponding emotional measurements in the analysis data. Beneficially, the first and second corpus training material enables the performance and accuracy of the one or more artificial intelligence algorithms to be optimized for processing the audio and video signals and generating emotional measurements based on the specific characteristics and features of the input signals.

The steps 302 to 306 are only illustrative, and other alternatives may also be provided where one or more steps are added, one or more steps are removed, or one or more steps are provided in a different sequence without departing from the scope of the claims herein.

Figure 4:
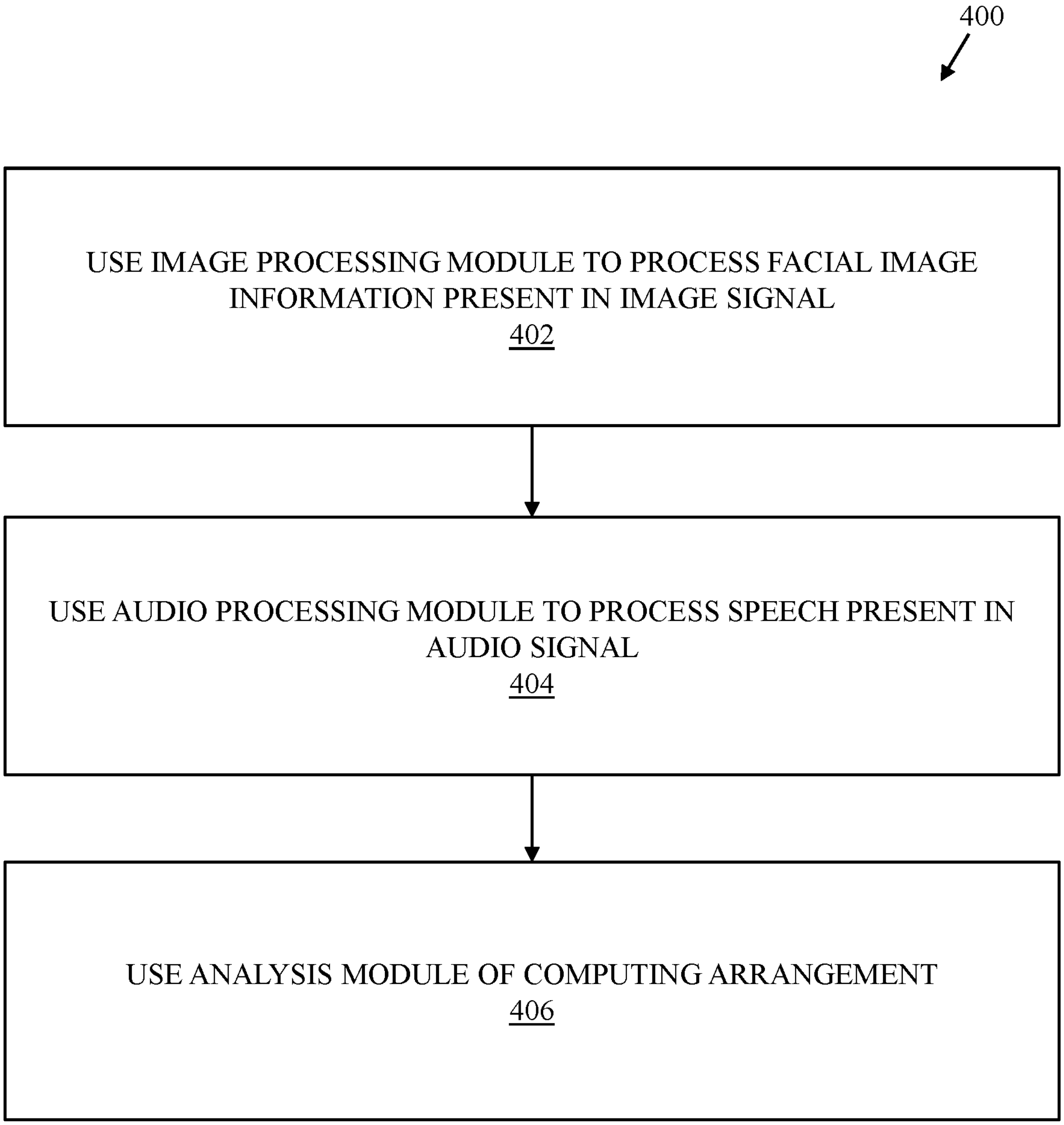
FIG. 4 is an illustration of a flowchart of a method, wherein the flowchart includes steps for using the system of FIGS. 1 and 2, in accordance with an embodiment of the present disclosure.

In FIG. 4, there is shown a flowchart of a method for using the system 200 to process at least audio and image signals to generate corresponding analysis data including emotional measurements. The method includes steps 402 to 406. At the step 402, the method 400 includes using the image processing module 106 to process facial image information present in the image signal to identify a plurality of key facial image points indicative of facial expression and to generate temporal facial status data. Suitably, the image processing module 106 identifies the plurality of key facial image points that are indicative of facial expression, such as eye corners, mouth corners, and eyebrow positions and generates temporal facial status data. The data captures the changes in facial expression over time, providing insights into the emotional state of the individuals in the images. The facial status data may be obtained through techniques such as facial landmark detection, facial feature extraction, or facial expression recognition.

At the step 404, the method 400 includes using the audio processing module 104 to process speech present in the audio signal by parsing the speech to correlate against a database of words to generate corresponding text data, and by processing the speech to determine temporal speech frequency information indicative of at least one of emphasis, hesitation, speech word rate, and to temporally relate the temporal speech frequency information with the text data. The audio processing module 104 utilizes techniques such as speech recognition and natural language processing to parse the speech and correlate it against the database of words, generating corresponding text data. Additionally, the audio processing module 104 may analyse the speech to determine temporal speech frequency information therein, which may indicate elements such as emphasis, hesitation, and speech word rate. The temporal speech frequency information is then temporally correlated to the text data, providing a synchronized representation of the speech content. In an embodiment, the image signals include video data that is captured concurrently with the audio signal.

At the step 406, the method 400 includes using the analysis module 110 of the computing arrangement 102, wherein the analysis module 110 includes one or more artificial intelligence algorithms to process the temporal facial status data, the text data and the temporal speech frequency information using emotional models to generate an interpretation of the audio and image signals, to generate the analysis data including the emotional measurements. The analysis module 110 utilizes one or more artificial intelligence algorithms to process the temporal facial status data, the text data, and the temporal speech frequency information using emotional models. The one or more artificial intelligence algorithms to include at least one of: neural networks, deep neural networks, Boltzmann machines, Hidden Markov Models, for processing at least the audio and image signals.

The emotional models are designed to interpret the audio and image signals and generate emotional measurements, which provide insights into the emotional content of the processed signals. The emotional models may be trained using a corpus of training material that relates training values of emotional measurements to samples of audio signals including speech information. The emotional measurements may include various quantitative or qualitative indicators of emotions, such as emotional labels (e.g., happy, sad, angry), emotional intensity scores, or other relevant emotional parameters. The generated analysis data, including the emotional measurements, may be used to gain a comprehensive understanding of the emotional aspects of the audio and image signals. For example, the analysis module 110 may use the emotional measurements to identify decision points occurring in a video discussion, such as moments of high emotional intensity or sudden changes in emotions. These decision points can provide valuable insights for further analysis, such as sentiment analysis, emotion recognition, or behavioural analysis.

The steps 402 to 406 are only illustrative, and other alternatives can also be provided where one or more steps are added, one or more steps are removed, or one or more steps are provided in a different sequence without departing from the scope of the claims herein.

A software product that is executable on computing hardware to implement the methods of the second aspect and third aspect.

The software product may be implemented, when executed on computing hardware, as an algorithm, wherein the software may be stored in the non-transitory machine-readable data storage medium to execute the methods 300, 400. The software may be stored on a non-transitory machine-readable data storage medium, wherein the storage medium may include, but is not limited to, an electronic storage device, a magnetic storage device, an optical storage device, an electromagnetic storage device, a semiconductor storage device, or any suitable combination of the foregoing. Examples of implementation of the computer-readable medium include, but are not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the invention, which are, for brevity, described in the context of a single embodiment, may also be provided separately or in any suitable combination or as suitable in any other described embodiment of the disclosure.

The invention claimed is:

1. A system for processing at least concurrent audio and image signals for a plurality of participants interacting in a conversation to generate corresponding analysis data including emotional measurements, wherein the system includes:

a computing arrangement comprising at least a hardware audio processing module for processing the audio signals and an image processing module for processing the image signals, wherein the image processing module is a camera, wherein each module is configured to use one or more artificial intelligence algorithms for processing its respective signal, wherein the image processing module is configured to process facial image information present in the image signals to identify a plurality of key facial image points indicative of facial expression and to generate temporal facial status data, wherein the audio processing module is configured to process speech present in the audio signals by parsing the speech to correlate against a database of words to generate corresponding text data, and by processing the speech to determine temporal speech frequency information indicative of at least one of emphasis, hesitation, speech word rate, and to temporally relate the temporal speech frequency information with the text data, and wherein the computing arrangement further includes an analysis module using one or more artificial intelligence algorithms to process the temporal facial status data, the text data and the temporal speech frequency information using emotional models to generate an interpretation of the audio and image signals of the plurality of participants to generate the analysis data including the emotional measurements, wherein the analysis data identifies patterns and trends during the conversation of each of the plurality of participants for determining potential issues or misunderstandings during the conversation between the plurality of participants, and wherein a participant is provided the analysis data in real-time to adjust conversational actions based on the determined potential issues or misunderstandings, wherein the analysis module detects a discrepancy comprising the emotional information derived from the audio signals indicating a first emotion and the emotional information derived from the image signals indicating a second emotion conflicting with the first emotion for the same participant at a temporally corresponding portion of the conversation, and to determine a measure of emotional sincerity of the participant from the detected discrepancy, wherein the measure of emotional sincerity is used in determining the potential issues or misunderstandings during the conversation between the plurality of participants.

2. The system of claim 1, wherein the image processing module is configured to process the image signals including video data that is captured concurrently with the audio signal.

3. The system of claim 1, wherein the system is configured to process a text signal in addition to the at least audio and image signals, wherein information present included in the text signal is used in conjunction with information included in the audio and image signals to generate the corresponding analysis data including the emotional measurements.

4. The system of claim 1, wherein the one or more artificial intelligence algorithms include at least one of: neural networks, deep neural networks, Boltzmann machines, Hidden Markov Models, for processing at least the audio and image signals.

5. The system of claim 1, wherein the analysis module uses at least the emotional measurements to determine decision points occurring in a video discussion giving rise to the audio and image signals.

6. The system of claim 5, wherein the decision points are determined by the analysis module from at least one of: temporally abrupt changes in the emotional measurements, temporally abrupt changes in speech content of the audio signal.

7. A method for training the system of claim 1, wherein the method includes:

(i) assembling a first corpus of training material relating training values of emotional measurements to samples of audio signals including speech information;

(ii) assembling a second corpus of training material relating training values of emotional measurements of samples of image signals including facial expression information; and (iii) applying the first and second corpus of training material to the one or more artificial intelligence algorithms to configure their analysis characteristics for processing at least the audio and video signals.

8. A method for using a system to process at least concurrent audio and image signals for a plurality of participants interacting in a conversation to generate corresponding analysis data including emotional measurements, wherein the system includes a computing arrangement comprising at least a hardware audio processing module for processing the audio signals and an image processing module for processing the image signals, wherein the image processing module is a camera, wherein each module is configured to use one or more artificial intelligence algorithms for processing its respective signal, wherein the method includes:

using the image processing module to process facial image information present in the image signal to identify a plurality of key facial image points indicative of facial expression and to generate temporal facial status data, using the audio processing module to process speech present in the audio signal by parsing the speech to correlate against a database of words to generate corresponding text data, and by processing the speech to determine temporal speech frequency information indicative of at least one of emphasis, hesitation, speech word rate, and to temporally relate the temporal speech frequency information with the text data, and using an analysis module of the computing arrangement, wherein the analysis module includes one or more artificial intelligence algorithms to process the temporal facial status data, the text data and the temporal speech frequency information using emotional models to generate an interpretation of the audio and image signals of the plurality of participants, to generate the analysis data including the emotional measurements, wherein the analysis data identifies patterns and trends during the conversation of each of the plurality of participants for determining potential issues or misunderstandings during the conversation between the plurality of participants, and wherein a participant is provided the analysis data in real-time to adjust conversational actions based on the determined potential issues or misunderstandings, wherein the analysis module further detects a discrepancy comprising the emotional information derived from the audio signals indicating a first emotion and the emotional information derived from the image signals indicating a second emotion conflicting with the first emotion for the same participant at a temporally corresponding portion of the conversation, and determines a measure of emotional sincerity of the participant from the detected discrepancy, wherein the measure of emotional sincerity is used in determining the potential issues or misunderstandings during the conversation between the plurality of participants.

9. The method of claim 8, wherein the method includes configuring the image processing module to process the image signals including video data that is captured concurrently with the audio signal.

10. The method of claim 8, wherein the method includes configuring to process a text signal in addition to the at least audio and image signals, wherein information present included in the text signal is used in conjunction with information included in the audio and image signals to generate the corresponding analysis data including the emotional measurements.

11. The method of claim 8, wherein the method includes arranging for the one or more artificial intelligence algorithms to include at least one of: neural networks, deep neural networks, Boltzmann machines, Hidden Markov Models, for processing at least the audio and image signals.

12. The method of claim 8, wherein the method includes configuring the analysis module to use at least the emotional measurements to determine decision points occurring in a video discussion giving rise to the audio and image signals.

13. The method of claim 12, wherein the decision points are determined by the analysis module from at least one of: temporally abrupt changes in the emotional measurements, temporally abrupt changes in speech content of the audio signal.

14. A software product stored in a non-transitory machine-readable data storage medium that is executable on computing hardware to implement a method as claimed in claim 8.

* * * * *